(No Model.)

J. F. HALE.
CHURN DASHER.

No. 317,124. Patented May 5, 1885.

WITNESSES:
John Cook
C. Sedgwick

INVENTOR:
J. F. Hale
BY Munn & Co.
ATTORNEYS.

UNITED STATES PATENT OFFICE.

JAMES F. HALE, OF STEPHENVILLE, TEXAS.

CHURN-DASHER.

SPECIFICATION forming part of Letters Patent No. 317,124, dated May 5, 1885.

Application filed August 14, 1884. (No model.)

*To all whom it may concern:*

Be it known that I, JAMES F. HALE, of Stephenville, in the county of Erath and State of Texas, have invented certain new and useful Improvements in Churn-Dashers, of which the following is a full, clear, and exact description.

My invention more particulary relates to reciprocating churn-dashers, which are concave on their under face; and it consists in certain special constructions of the several or main parts of such a dasher, whereby a greatly improved effect and numerous advantages are obtained, substantially as hereinafter described.

Reference is to be had to the accompanying drawings, forming a part of this specification, in which similar letters of reference indicate corresponding parts in both the figures.

Figure 1:
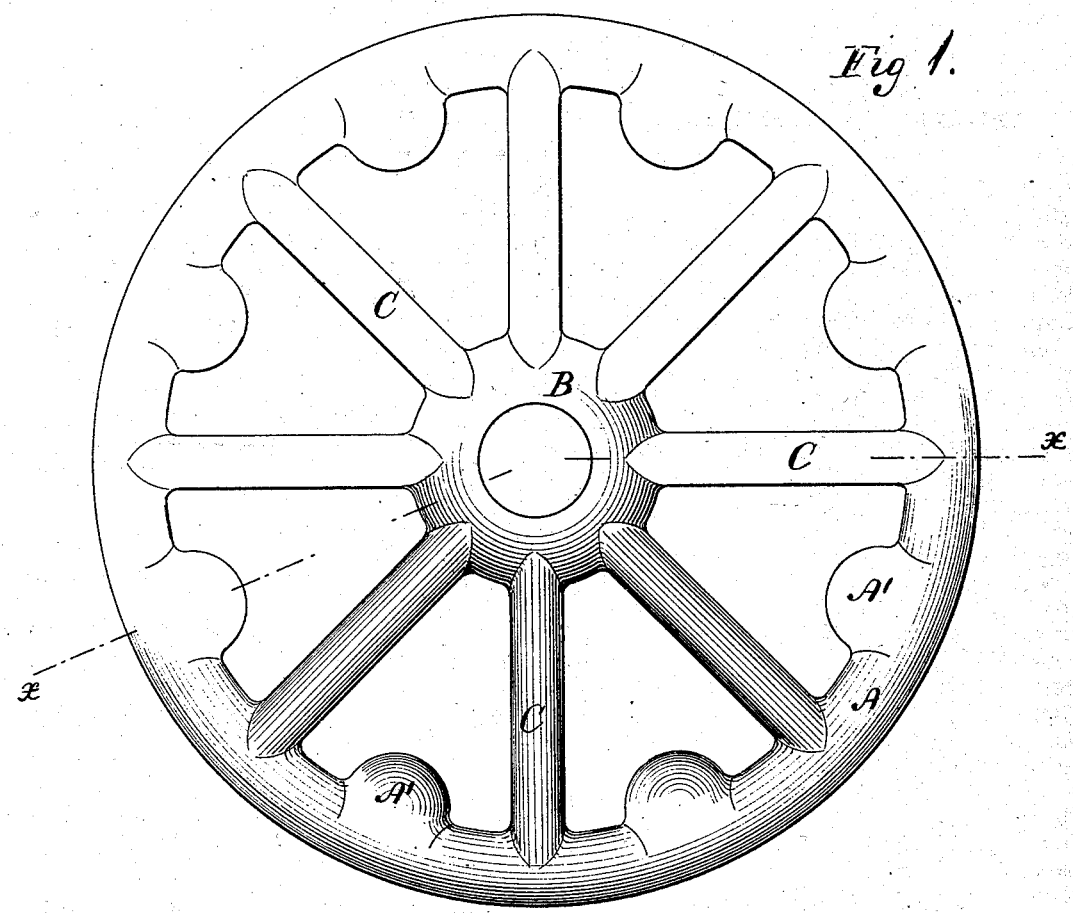
Figure 2:
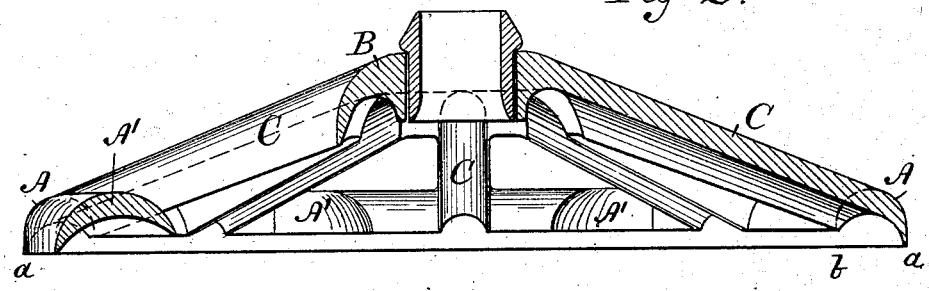

Figure 1 represents a top view of a churn-dasher embodying my invention, and Fig. 2 a vertical section of the same on the irregular line $x$ $x$ in Fig. 1.

The dasher shown in the drawings, and which may be made of wood, metal, or any suitable material, is not only generally of concave form on its under surface and of convex or conical form on its upper surface, but is otherwise of special configuration, as follows: Thus the dasher, which is a circular one, and is made up, principally, of an outer rim, A, nave or center portion, B, and arms C C, uniting said rim and nave, has its outer rim, A, not only of concavo-convex shape in its transverse section, but has the outer edge, $a$, of said rim arranged to extend below the level of its inner edge, $b$, so that said outer edge, $a$, in the downward stroke of the dasher will strike the cream in advance of the inner edge, $b$, and, said rim being concave on its under side, the cream will be thrown toward the center of the dasher. The rim A, too, will at the same time carry air down into the cream, the value of which is well understood, and to augment this effect the inner side of the rim A is provided with inverted air cups or cells A', arranged between the arms C C of the dasher. The air is thus carried into the cream in advance of the center portion or nave B, and the cream is forced through or between the arms C C. The arms C C are also of concavo-convex form in their transverse section, the concavity being undermost, and they, too, by their construction will carry air down into the cream. The nave or center portion, B, of the dasher is arranged considerably higher than the outer rim, A, and air-cups A', so that as the milk or cream is thrown toward the center by the outer portion of the dasher the nave will in the downstroke of the dasher come in contact with the milk or cream so thrown, and then operate in conjunction with the rest of the dasher to give the cream a downward motion. The nave B is also of concavo-convex form in transverse section, and as all the parts of the dasher are so constructed the milk or cream will readily flow from or off the convex upper surfaces of the dasher in its upstroke, and the cream will flow around the rim A, air cups or cells A', and arms C C at every stroke of the dasher.

A churn-dasher constructed as described will do its work with very great rapidity, inasmuch as it will convey a large quantity of air into the cream, and by reason of its giving the cream a double or reverse motion in each down movement of the dasher, the rim A giving it an upward motion and the nave B a downward one. Being of concavo-convex construction both generally and separately as regards its several parts, it will give a more effective motion or action on the cream. Its upwardly-tapering shape and ease with which the cream passes off from the dasher when being raised from the bottom of the churn makes it exceedingly easy to operate. It is easily cleaned, too, as there are not or need not be any small apertures or contracted spaces for the cream or butter to lodge in. Furthermore, it is preferred to construct the dasher of metal, which will not only facilitate cleaning, but will prevent it from absorbing cream that is liable to sour in the dasher and spoil succeeding "churnings."

The improved dasher is not only cheap to construct, but it will make more butter than many other or most dashers and in less time. Butter being separated from the milk principally by the air introduced into the milk, the air-bubbles produced by the air carried into the milk by the dasher will be brought in contact with the arms C C, rim A, and nave B, and the butter be separated as the air thus comes in contact with said parts, and the butter will be of a superior color and quality, and not have its grain broken as is the case with many churns.

In further explanation of the action it may be stated that in operation the dasher is raised only to the surface of the cream and then returned with a downward motion. Upon the downward stroke the globules of butter are ruptured by concussion as well as separated from the cream. At the same time air is carried down by the cells A', rim A, nave B, and arms C C, and said air brought in contact with said globules, which tends to increase their agitation and to impart a better color to the butter. Upon the upward motion of the dasher, the nave B, arms C C, rim A, and cells A' will, by their concave construction, cause a suction to take place, and the concavo-convex shape of the several parts of the dasher will produce a more rapid evolution of the cream.

I do not claim a churn-dasher of concavo-convex form, nor one having a concave rim or arms.

Having thus described my invention, I claim as new and desire to secure by Letters Patent—

As an article of manufacture, the conical or concavo-convex churn-dasher having a circular rim, A, the air cups or cells A', the arms C C, and the raised nave or center portion, B, all of concavo-convex shape in their transverse sections, substantially as shown and described.

JAMES F. HALE.

Witnesses:
J. C. CHAPMAN,
C. F. OVERLEY.